United States Patent [19]
Hwang et al.

[11] Patent Number: 5,781,857
[45] Date of Patent: Jul. 14, 1998

[54] METHOD OF ESTABLISHING AN EMAIL MONITOR RESPONSIVE TO A WIRELESS COMMUNICATIONS SYSTEM USER

[75] Inventors: Yeou H. Hwang, Naperville; Jonathan R. Engelsma, South Elgin, both of Ill.

[73] Assignee: Motorola, Inc., Schaumburg, Ill.

[21] Appl. No.: 675,505

[22] Filed: Jun. 28, 1996

[51] Int. Cl.$^6$ .......................... H04M 11/00; G05B 23/02
[52] U.S. Cl. .................. 455/412; 455/426; 340/825.15
[58] Field of Search ........................ 379/59, 60, 58, 379/57, 100; 455/33.1, 412, 426, 515, 31.2, 466; 340/825.44, 825.15, 825.27

[56] References Cited

U.S. PATENT DOCUMENTS

| | | |
|---|---|---|
| 3,715,506 | 2/1973 | Haag et al. . |
| 3,736,380 | 5/1973 | Shadd et al. . |
| 4,897,866 | 1/1990 | Majmudar et al. . |
| 4,899,373 | 2/1990 | Lee et al. . |
| 5,151,929 | 9/1992 | Wolf . |
| 5,177,780 | 1/1993 | Kasper et al. . |
| 5,222,125 | 6/1993 | Creswell et al. . |
| 5,329,578 | 7/1994 | Brennan et al. . |
| 5,333,266 | 7/1994 | Boaz et al. ........................ 395/200 |
| 5,377,261 | 12/1994 | Baals et al. . |
| 5,384,831 | 1/1995 | Creswell et al. . |
| 5,418,835 | 5/1995 | Frohman et al. ................ 379/59 X |
| 5,420,911 | 5/1995 | Dahlin et al. .................... 379/58 X |
| 5,457,732 | 10/1995 | Goldberg . |
| 5,469,500 | 11/1995 | Satter et al. . |
| 5,475,746 | 12/1995 | Miller et al. . |
| 5,488,650 | 1/1996 | Greco et al. . |
| 5,509,000 | 4/1996 | Oberlander . |
| 5,530,740 | 6/1996 | Irribarren et al. . |
| 5,544,225 | 8/1996 | Kennedy, III et al. .................. 455/412 |
| 5,579,372 | 11/1996 | Anstrom .................................. 455/412 |
| 5,579,472 | 11/1996 | Keyworth, II et al. ................ 395/326 |
| 5,590,178 | 12/1996 | Murakami et al. . |
| 5,600,703 | 2/1997 | Dang et al. ........................ 455/412 X |
| 5,604,788 | 2/1997 | Tett .................................... 455/412 |
| 5,608,786 | 3/1997 | Gordon ................................ 379/100 |
| 5,619,648 | 4/1997 | Canale et al. ....................... 395/200.1 |
| 5,635,918 | 6/1997 | Tett .................................. 340/825.44 |
| 5,686,536 | 10/1996 | Tiller et al. .............................. 379/58 |

FOREIGN PATENT DOCUMENTS

92/179050  10/1992  WIPO .

*Primary Examiner*—David R. Hudspeth
*Assistant Examiner*—Scott Richardson
*Attorney, Agent, or Firm*—Heather L. Creps; Raymond J. Warren

[57] ABSTRACT

A user, after accessing (41) the communication system (10), selects (42) a paged email service option. In response, the communication system (10) dispatches (43) a service logic block to a service node proxy (110) of an email system (101–105). The service logic block is deposited (44) in a site-specific service logic block repository (112) of the email system (101–105). An email monitor is established (45) for the email system (101–105). Once established, the email system sends (46) an acknowledgment to the communication system (10). The user is then notified (47) of receipt of the acknowledgment.

2 Claims, 3 Drawing Sheets

5,781,857

METHOD OF ESTABLISHING AN EMAIL MONITOR RESPONSIVE TO A WIRELESS COMMUNICATIONS SYSTEM USER

FIELD OF THE INVENTION

The present invention relates, in general, to communication systems and, more particularly, to a method of establishing a message monitor in a communication system.

RELATED APPLICATIONS

The present applications relates to U.S. patent applications Ser. No. 08/630,699 filed Apr. 12, 1996 titled Method of Originating a Call in a Communication System also invented by Engelsma et al. and assigned to Motorola Inc.

BACKGROUND OF THE INVENTION

Presently wireline communication systems have the capability to deliver electronic mail (email) to users based upon the users electronic address. Presently, systems are available that, when a user receives an email, will be paged by the email system. This page may be merely a page identifying the email system and indicating that email has arrived, or may contain a portion of the email.

There are also methods of converting data messages to voice messages to be delivered over a voice communication system (such as a wireless communication system or a land-line system). Such a system is described in U.S. Pat. No. 5,418,835 issued to Frohman et al. on May 23, 1995 and assigned to Motorola Inc.

However, all of the present systems have dedicated functions located internal to the email system itself. There is no provision for the user to be able to tailor an email system independent monitoring function that will notify the user when an email arrives to the users account. Present systems also do not provide for the user to be able to direct that notification of email messages be directed to different locations or through different telecommunication systems.

DETAILED DESCRIPTION OF THE DRAWINGS

Figure 1:
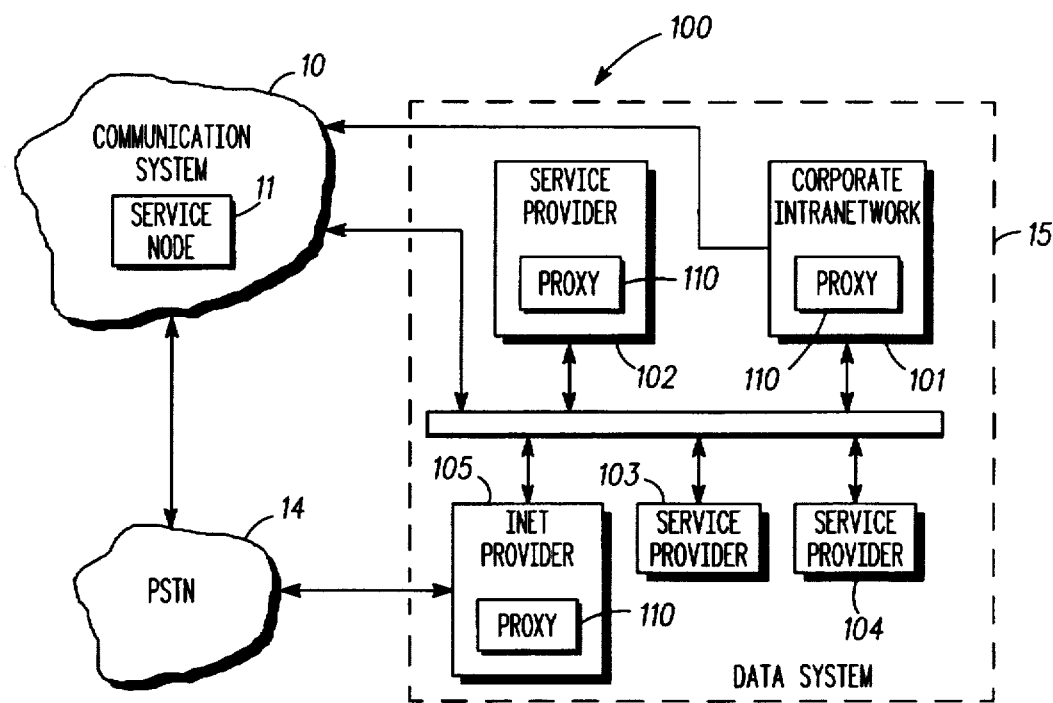
FIG. 1 is a network architectural diagram of a network capable of utilizing the present invention.

Referring initially to FIG. 1, a network, generally designated 100, is illustrated. Network 100 consists, generally, of a communication system 10 (such as a cellular communication system, a land mobile communication system, or a satellite communication system), a data system 15, and a PSTN (Public Switched Telephone Network) 14. Within communication system 10 is a service node 11, which is described in detail, below, with regard to FIG. 2. Data system 15 is a network, such as the internet network, that will provide access to various other networks. Some of the other networks provided include a corporate intranetwork 101 and service provider networks 102–105. In operation, service node 11 causes a service node proxy 110 to be implemented in one of the nodes having an email system (101–105). Service node proxy 110 is described in more detail in the description of FIG. 3, below.

Figure 2:
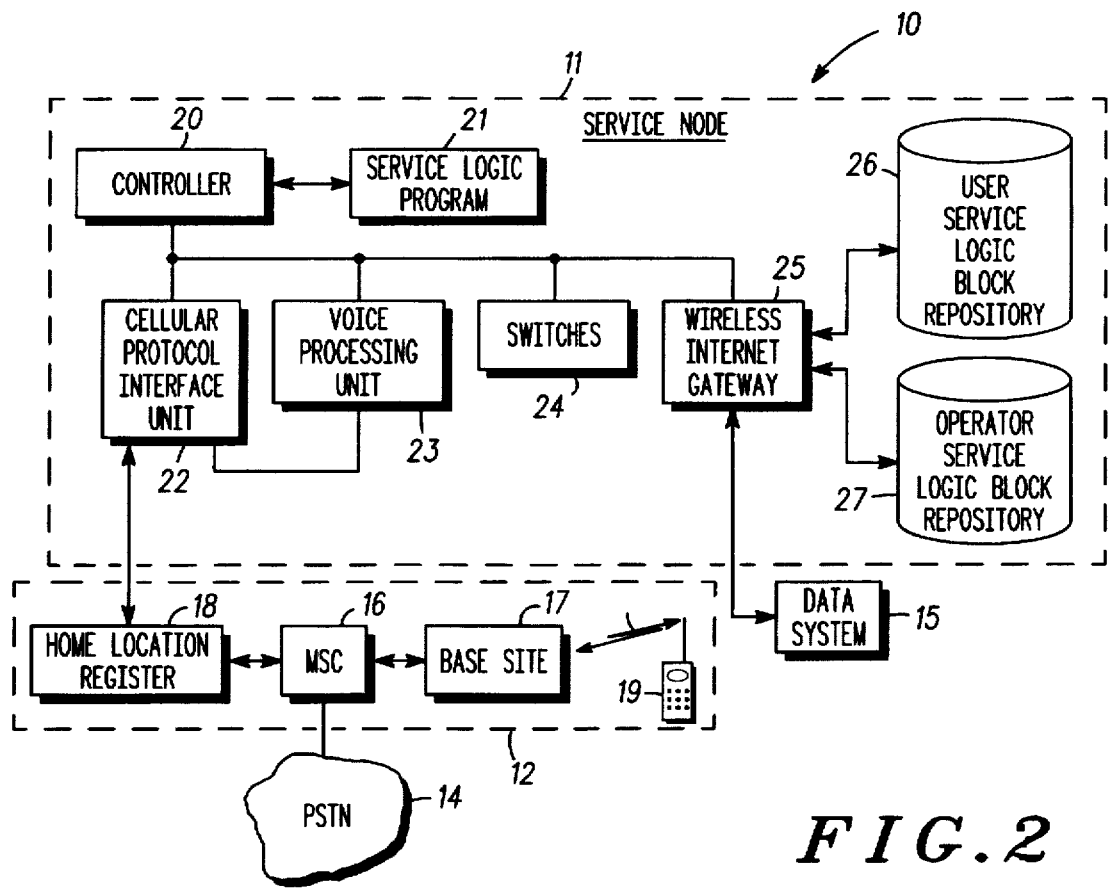
FIG. 2 is a block diagram of a communication system capable of operating according to the present invention.

Referring now to FIG. 2, a block diagram of a communication system, generally designated 10, capable of operating according to the present invention is illustrated. System 10 consists of a service node 11 which is coupled, in this example, to wireless communication system 12 which is coupled to PSTN 14. It should be noted here that the present invention will also function without wireless communication system 12 by way of direct connection to PSTN 14. System 10 also includes a connection to a data system 15, such as an internet connection.

Within wireless communication system 12 is a mobile switch center (MSC) 16 coupled to PSTN 14 and a base site 17. System 12 will have one or more registers associated therewith, such as a home location register (HLR) 18. Wireless communication is conducted over a radio frequency (RF) channel 118 with a mobile subscriber (MS) communication unit 19.

Service node 11 provides the elements to conduct the processing involving the present invention described below. Service node 11 consists of a controller 20 having a service logic program 21 associated therewith. Controller 20 is coupled to a cellular protocol interface unit 22, a voice processing unit 23, a switch 24, and a wireless internet gateway (WIG) 25. Cellular protocol interface unit 22 is coupled to HLR 18 and functions to provide an interface between HLR 18 and controller 20. Cellular protocol interface unit 22 acts as a protocol converter to convert the protocol used by HLR 18 into those used by controller 20. Voice processing unit 23 operates in conjunction with the email retrieval service to present menus to the user; provide voice activation of user commands; and conduct text-to-speech rendering of email messages. Switch 24 is used to inject data network information into a voice path. One example of injecting data network information is where switch 24 injects the output from VPU 23 into the voice system.

WIG 25 provides a process that delivers data network related service requests to hosts residing on the data network. In most cases, WIG 25 executes small fragments of service logic that will retrieve email from data system 15.

For an email retrieval service, the master service logic program being executed by the control computer requests that WIG 25 execute a service logic block that requests email from a service node proxy running elsewhere on the data network host. The invoked service logic block waits for a response from the remote proxy and returns the desired data to the master service logic program when the response arrives.

Controller 20 operates by invoking the appropriate service logic program when an incoming call arrives at switch 24. This service logic program is a master program that, in one particular case, implements the retrieval of an email data message via WIG 25. Controller 20 also directs the conversion of the email data message to an audio message using voice processing unit 23. When a selection is made by a subscriber from a list of menu items, controller 20 also directs the various components within the proper functions to complete the requested activity.

Figure 3:
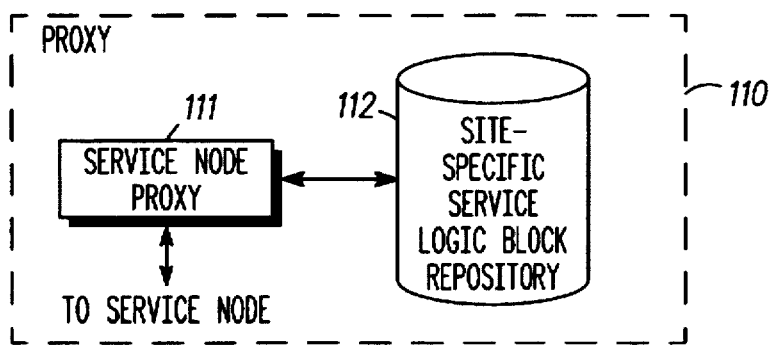
FIG. 3 is a block diagram of the service node proxy of FIG. 1.

Referring now to FIG. 3, a block diagram of service node proxy architecture 110 of FIG. 1 is illustrated. This proxy consists of the proxy 111 itself and an associated data network site-specific service logic block repository 112.

Figure 4:
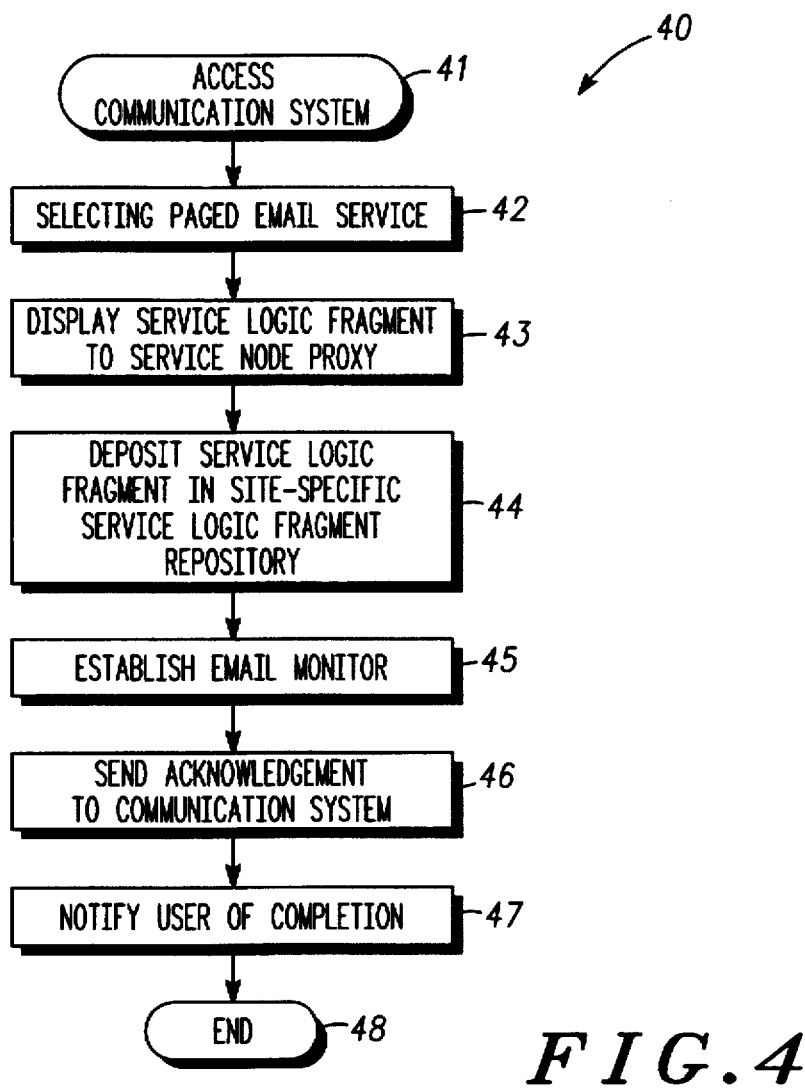
FIG. 4 is a flow chart illustrating a method embodying the present invention.

In FIG. 4, a method, generally designated 40, of establishing a monitor at a remote email system is illustrated.

Process 40 commences at step 41 where the user accesses service node 11 of communication system 10. The communication system can be one of an analog cellular communication system, a time division multiple access cellular communication system, a code division multiple access cellular communication system, a wireless data communication system, or other suitable system. Once access is made to the communication system, the user may select an option to activate a paged email service, step 42. This activation may be accomplished by making the appropriate menu selection or other suitable method. When email monitoring is requested, a service logic block is dispatched from the Wireless Internet Gateway 25 to the service node proxy 110 of the remote email system 101–105, step 43. When service node proxy 110 receives the service logic block, it is deposited in the site-specific service logic block repository 112, step 44. An email monitor will then be established, step 45. The remote email system will then begin monitoring for the specified parameters. These specified parameters range from general parameters such as notifying the user when any email arrives to specific parameters such as notifying the user when an email arrives from a specific address having a specific topic.

Once the monitor is established in step 45, an acknowledgment message is sent from service node proxy to Wireless Internet Gateway 25, step 46, indicating that the monitor was successfully established. Communication system 10 then acknowledges the establishment to the user, step 47. Process 40 then ends, step 48.

Thus, a process is described above which can remotely establish monitoring of email by a monitoring function independent of the email system.

Figure 5:
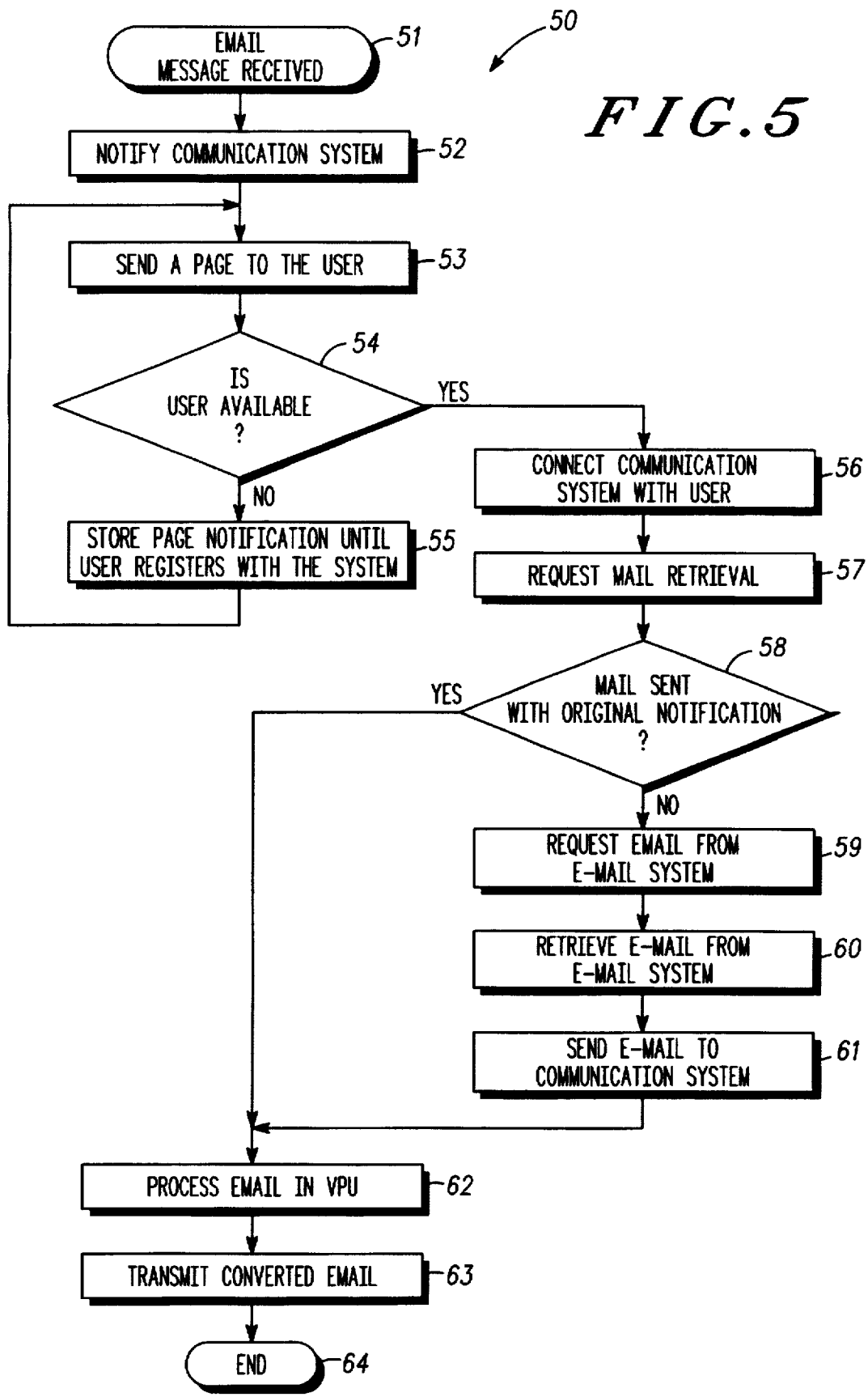
FIG. 5 is a flow chart illustrating a second method embodying the present invention.

After the monitor is in place, it will continue to passively monitor email system 101–105 until an email message is received. The system then executes process 50 shown in the flow chart of FIG. 5. Process 50 begins at step 51 when an email message is received at email system 101–105. Service node proxy 110 will send a notification to the Wireless Internet Gateway 25 of communication system 10, step 52. Communication system 10 then originates a connection (e.g. places a call) by sending a page to the user, step 53. If the user is not available, decision step 54, then the page can be stored in the communication system until the user registers (becomes available) on the communication system, step 55. Process 50 would then loop back to step 53 until the user became available, decision step 54.

If the user is available, then the user is connected with communication system 10, step 56. The user is then given the option to request the email, step 57. If the email is requested, communication system 10 will determine if the email message was sent with the notification from the email system, decision step 58. If the email message was not sent with the notification, a request for the email is sent from communication system 10 to email system 101–105, step 59. The email message is then retrieved from email system 101–105, step 60, and sent to communication system 10, step 61.

Once the email message is received following step 61 or if the email was sent with the original notification, decision step 58, the email message is processed in voice processing unit 23, step 62. The converted email message is then sent to the user, step 63. Process 50 then ends, step 64.

The above described method provides a dynamic email retrieval system that may be monitored remotely by an email independent monitoring function that will notify the user upon the arrival of an email message.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. For use in providing services to a user of a wireless communication system, a method of establishing an email monitor external to the wireless communication system comprising:

accessing the wireless communication system;

selecting an email service option;

dispatching a service logic block from the wireless communication system to an email system external to the wireless communication system;

depositing said service logic block in a site-specific service logic block repository of said email system, said service logic block monitoring for predetermined parameters;

establishing said email monitor for said email system; and sending an acknowledgement of the establishment of said email monitor to said communication system; and notifying a user of receipt of the acknowledgment;

in response to said service logic block detecting said predetermined parameters, said email monitor notifying the wireless communication system when an email message arrives at said email system.

2. The method of claim 1 wherein said wireless communication system is one of an analog cellular communication system, a time division multiple access cellular communication system, a code division multiple access cellular communication system, and a wireless data communication system.

* * * * *